FIG. 1

RESET SELECTOR

INVENTOR.
IMRE MOLNAR

June 22, 1954          I. MOLNAR          2,682,044
INDICATOR RESETTING SYSTEM
Original Filed Dec. 30, 1948          8 Sheets-Sheet 2

FIG. 2

*INVENTOR.*
IMRE MOLNAR
BY M. Walter Owen
ATTY.

June 22, 1954

I. MOLNAR

2,682,044

INDICATOR RESETTING SYSTEM

Original Filed Dec. 30, 1948

June 22, 1954 — I. MOLNAR — 2,682,044
INDICATOR RESETTING SYSTEM
Original Filed Dec. 30, 1948 — 8 Sheets-Sheet 8

INVENTOR.
IMRE MOLNAR
ATTY.

Patented June 22, 1954

2,682,044

UNITED STATES PATENT OFFICE 2,682,044

INDICATOR RESETTING SYSTEM

Imre Molnar, Chicago, Ill., assignor to Automatic Electric Laboratories, Inc., Chicago, Ill., a corporation of Delaware Original application December 30, 1948, Serial No. 68,273, now Patent No. 2,647,249, dated July 28, 1953. Divided and this application February 2, 1952, Serial No. 269,680

8 Claims. (Cl. 340—154)

The present invention is a division of my co-pending application, Serial No. 68,273, filed December 30, 1948 now Patent No. 2,647,249, for improvements in a space reservation system. That application sets forth a system adapted for use in a reservation office of a common carrier and, as an example, the system is described for typical usage by an air line. The system enables reservation clerks to register space reservation aboard a particular vehicle of the carrier, which is to be operated over a pre-determined course at some particular future time and date, locally at a common display panel; and in addition provides a novel apparatus whereby complete information of such reservations is transmitted to and is automatically and rapidly recorded at reservation offices which are distant from such local office.

Figure 10:
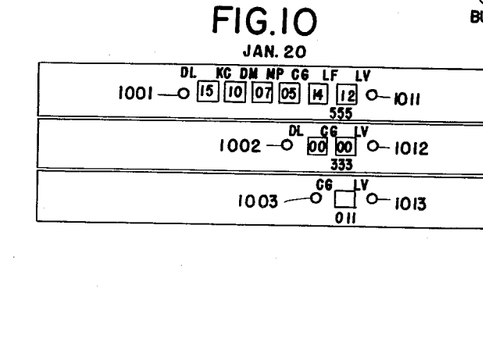
Fig. 10 shows a portion of the display panel upon which are mounted the two-digit space indicators.
Figure 11:
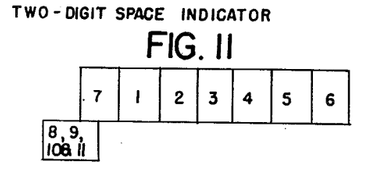
Fig. 11 shows the arrangement of the figures to complete the system.

The display panel upon which such information is registered contains, in case it is used by an air line office, a plurality of groups of space indicators, one group for each flight, there being a space indicator for each stop the air line is scheduled to make in the flight, the panel containing enough groups to cover all flights over a period of ten days. Such space indicators are adapted to indicate, by number or by some code arrangement, the number of available spaces for passengers between the station represented by the indicator and the next succeeding scheduled stop of such air line carrier. The indicators in each group are preferably arranged in a row, the first indicator of a row representing the spaces available aboard the carrier between the starting terminal and the first scheduled stop, the second indicator of the same row representing the spaces available between the first and second scheduled stops, and so forth until the last indicator of the row represents the available spaces between the next to the last scheduled stop and the final flight terminal. The rows of indicators representing flights on the same date are preferably mounted one below the other in a vertical column, the vertical column then being labeled at the top by the date. The vertical columns of flights are then mounted side by side, the order of which being determined by the dates. The display panel is then capable of further expansion to report reservation information for as many days as is deemed desirable. A part of one column of indicators is shown in Fig. 10.

My co-pending above mentioned application provides for the necessary switching equipment whereby the space indicators can be actuated by any one of a plurality of sets of operating keys which are provided at a reservation clerk's position. Operation of one of these sets of keys by a clerk will cause the switching apparatus to electrically connect such clerk's position first to the equipment associated with the space indicators of a particular date and then to the space equipment associated with the space indicators of a particular flight, after which time the clerk, by further operation of such keys, will actuate the space indicators corresponding to the stops between the city of departure and the city of destination. The preferred arrangement is to have each space indicator visually display the number of spaces available for reservation in the carrier for the portion of such flight represented by such indicator. Reservation of space represented as available by such indicators is then indicated by subtracting a number of desired spaces from the previously displayed number of unreserved spaces.

An object of this invention is to provide, in a system wherein a plurality of groups of indicators are to be reset to predetermined positions, means for automatically resetting each of the indicators in the groups, the groups being reset automatically in order.

Another object of this invention is to provide, in a system wherein the indicators of one group of indicators in a plurality of groups are to be reset to a pre-determined position, means for selecting the desired group from among the plurality of groups and means for then automatically and simultaneously resetting all the indicators in the selected group.

Another object of this invention is to provide a system for resetting each of a plurality of indicators from any miscellaneous position to a normal position automatically under control of a common control means and for then moving the indicators simultaneously and in unison from the normal position to a predetermined position automatically under control of the same control means and for then stopping the indicators simultaneously when they reach the predetermined position.

Other objects and features of this invention will become apparent upon a perusal of the specification when taken in conjunction with the accompanying drawings comprising Figs. 1 to 11, inclusive, in which:

Figs. 1 through 6, inclusive, show the circuits of a re-set converter and a re-set selector which are preferably controlled from a supervisor's position. The selector switch is a Strowger type step-by-step, two-motion switch having eight wipers, 191 to 198, a vertical stepping magnet 190, a rotary stepping magnet 199, a release magnet 177, vertical off-normal springs 209 (shown at the upper right of Fig. 2) and cam springs 203 which operate when the wipers are rotated to the eleventh position at any level. This switch has, in addition, a vertical wiper 330 (Fig. 3) which is operated in a vertical step-by-step manner by the vertical magnet 190, during which motion the wiper engages successive vertical bank contacts associated therewith.

Fig. 7, which corresponds to Fig. 29 in the cited co-pending case, shows one of a number of reset connectors which are accessible to the reset selector. The connectors in turn have access to the space indicators. The connector switch is a Strowger step-by-step, two-motion switch having seven wipers, 731 to 737, inclusive, a vertical magnet 730, rotary magnet 738, and a release magnet 739. The switch also includes interrupter springs 726 which are operated by the vertical magnet 730, vertical off-normal springs 724 which are operated on the first vertical step of the wipers, cam springs 723 which are operated on the eleventh rotary step of the wipers at any level, and normal post springs N. P. S. which are operated only when the wipers step to the tenth level. In addition to the switch, the connector circuit includes a connect relay 710 which is actuated to connect impulse circuits to a group of five space indicators after they have been selected by the connector switch.

Fig. 9 shows a space indicator of the type which may be used in the invention. It comprises a tens-digit wheel 910, a units-digit wheel 901, a stepping magnet 904, off-normal springs 905 and cams 911 and 912. Cam 911 is operated with digit wheel 910 and cam 912 is operated with digit wheel 901. Each of the cams has one notch, the notches being in alignment while the display is being changed from "00" to "99." The lever arm 903, which is pivoted at point 902, bears against both cams and pivots counter-clockwise when the notches are aligned. The indicator is operated in response to each de-energization of its stepping magnet 904 to display a number one less than that previously displayed in one of any well known counter-operating manners. Normally, contacts 906 of the off-normal springs 905 are open and contacts 907 are closed to connect the windings of the stepping magnet 904 in series. However, when the display is changed from "00 to "99," off-normal springs 905 are operated by arm 903 to close contacts 906 and open contacts 907. At contacts 907 the lower winding of magnet 904 is disconnected from the upper winding and at contacts 906 the upper winding is connected directly to ground potential.

Each level of the selector contact banks corresponds to a particular date. And since there are ten levels in the selector switch, ten dates are provided for in this particular embodiment of the invention. Each set of bank contacts in a selector bank level is associated with one connector, the connector having access to indicators on flights of that particular date only. Each set of connector bank contacts has access to up to five indicators. Where a flight requires the use of five or less indicators, one set of connector bank contacts only is necessary to provide for the indicators thereof. Where a flight requires six to ten indicators, inclusive, two sets of connector bank contacts are necessary for the flight; where eleven to fifteen indicators, inclusive, are required, three sets of connector bank contacts are needed for the flight, etc.

Figure 2:
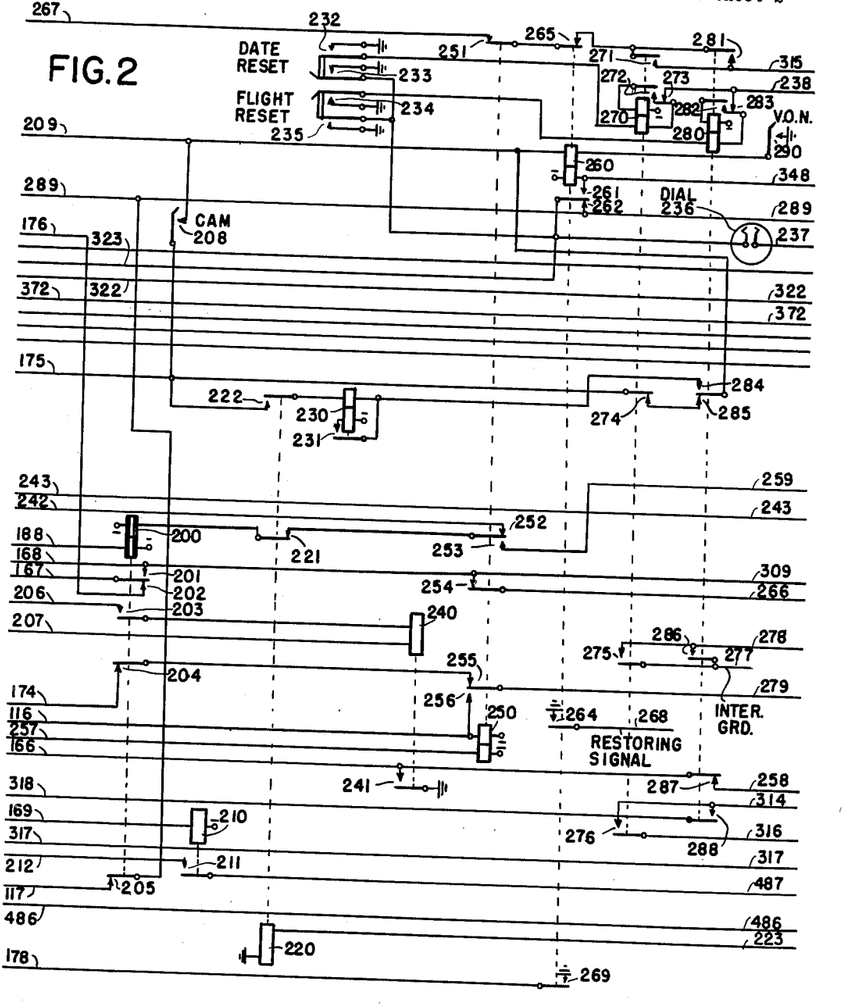
Figure 3:
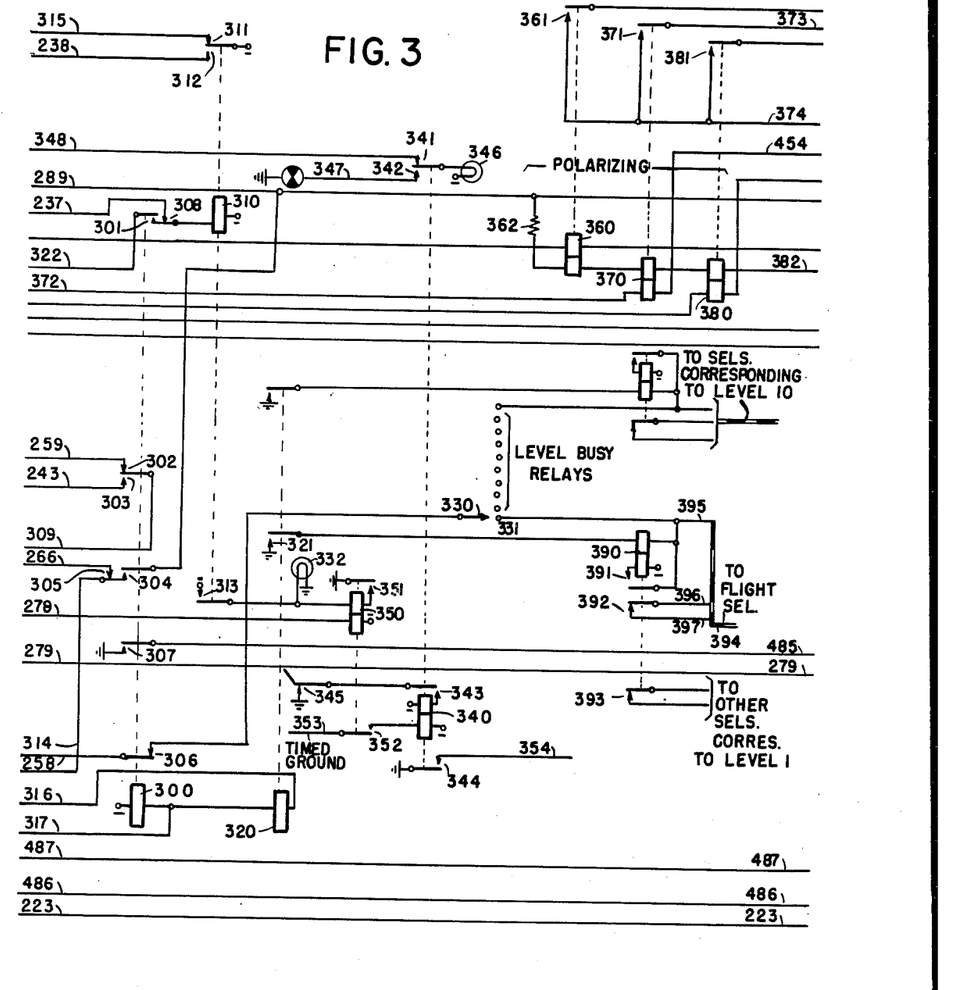
Figure 4:
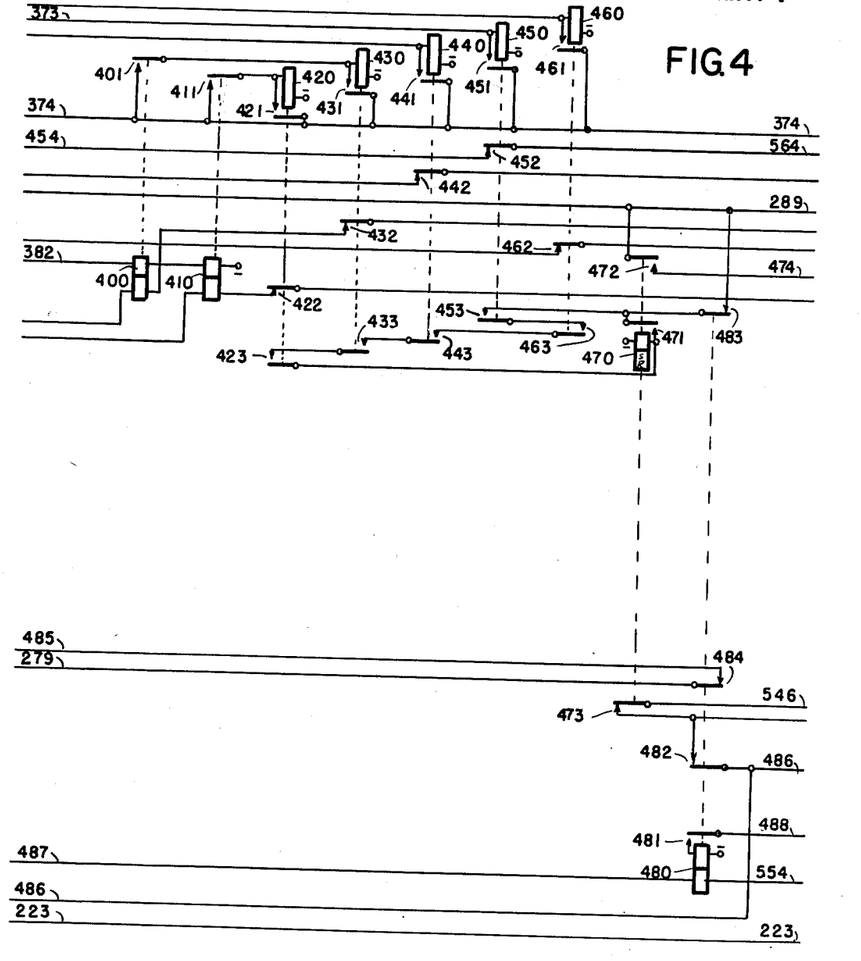
Figure 5:
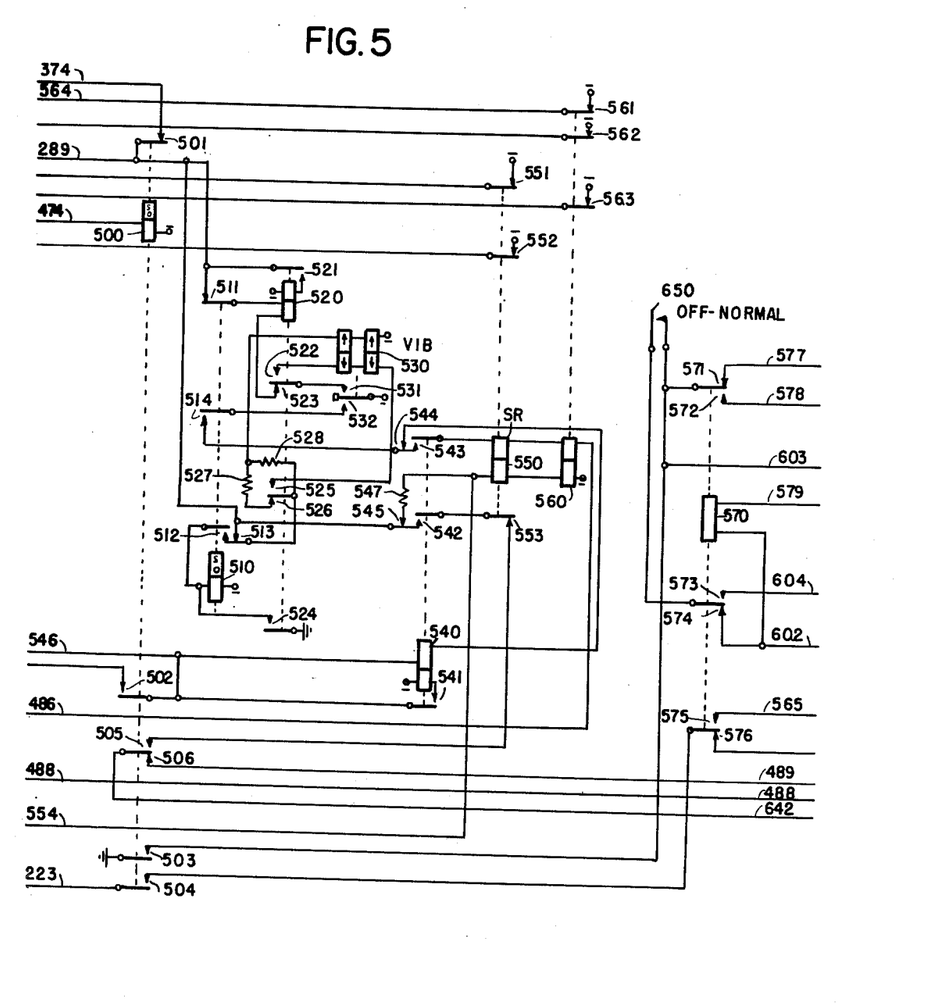
Figure 6:
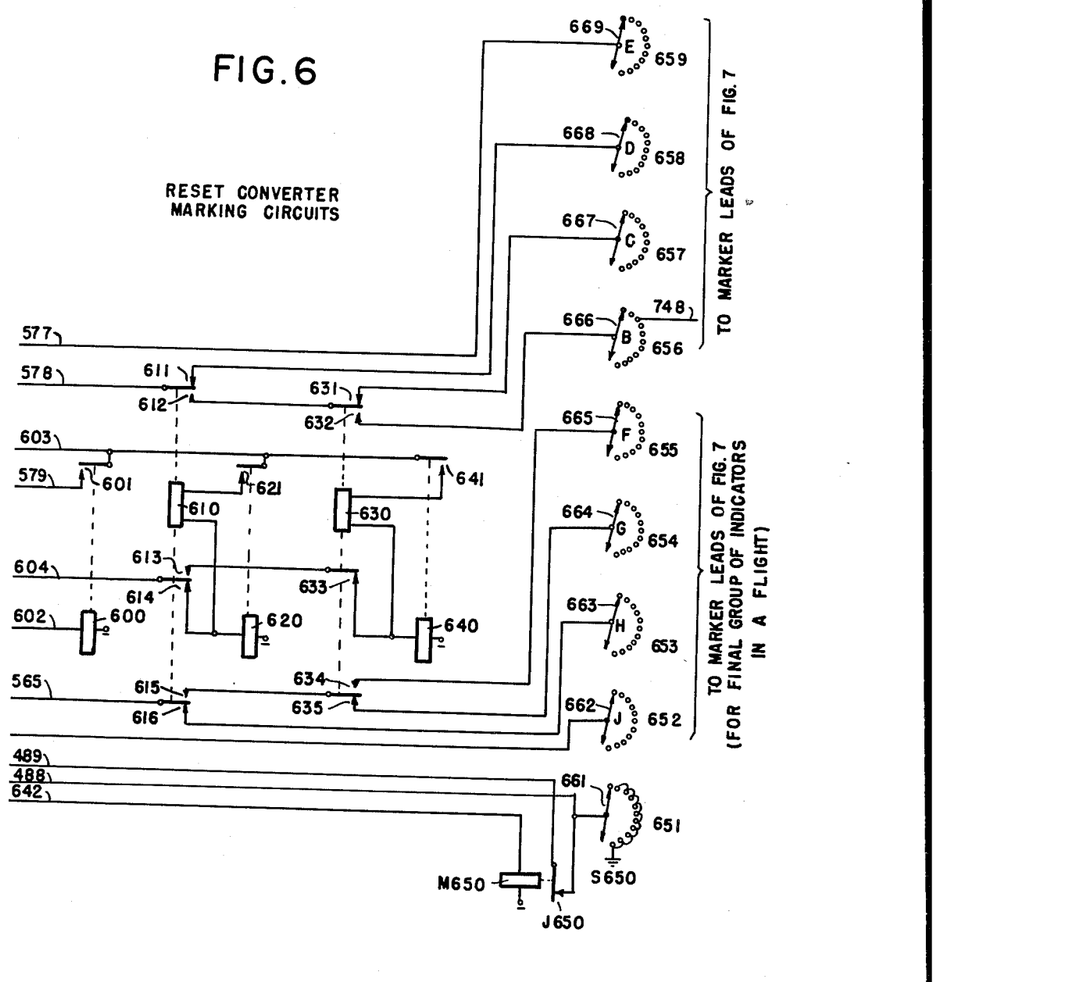

The resetting of the indicators is initiated from the supervisor's position by operation of either the Date Reset key or the Flight Reset key of Fig. 2. Operation of the Date Reset key conditions the converter circuits for resetting all indicators of all flights on a particular date. Operation of the flight Reset key conditions the converter circuits for resetting only those indicators associated with a selected flight on a particular date.

If the supervisor desires to reset all indicators on all flights on a particular date he operates the Date Reset key and the selector switch will then respond to a first digit dialed by the supervisor to step to a particular level and thus select a particular date. The selector then rotates automatically from bank contact set to bank contact set across the level, stopping at each set to seize the associated connector which then in turn automatically steps vertically from level to level and rotary in each level from bank contact set to bank contact set to thereby cause all the indicators associated with each connector accessible over the selected selector bank level to be reset by the converter circuit to a predetermined position, the selector causing a signal to be given to the supervisor when it steps from the last contact set in the selected level.

If the supervisor desires to reset only those indicators associated with a particular flight on a particular date, he operates the Flight Reset key. The selector responds to two digits dialed by the supervisor to select a particular level of the selector and a particular bank contact set in the level and to seize the connector associated therewith, and the connector then responds to two more digits dialed by the supervisor to select the indicators of a particular flight on that date, the converter circuit then operating to reset these selected indicators.

The operation of the system will now be described in detail.

Figure 1:
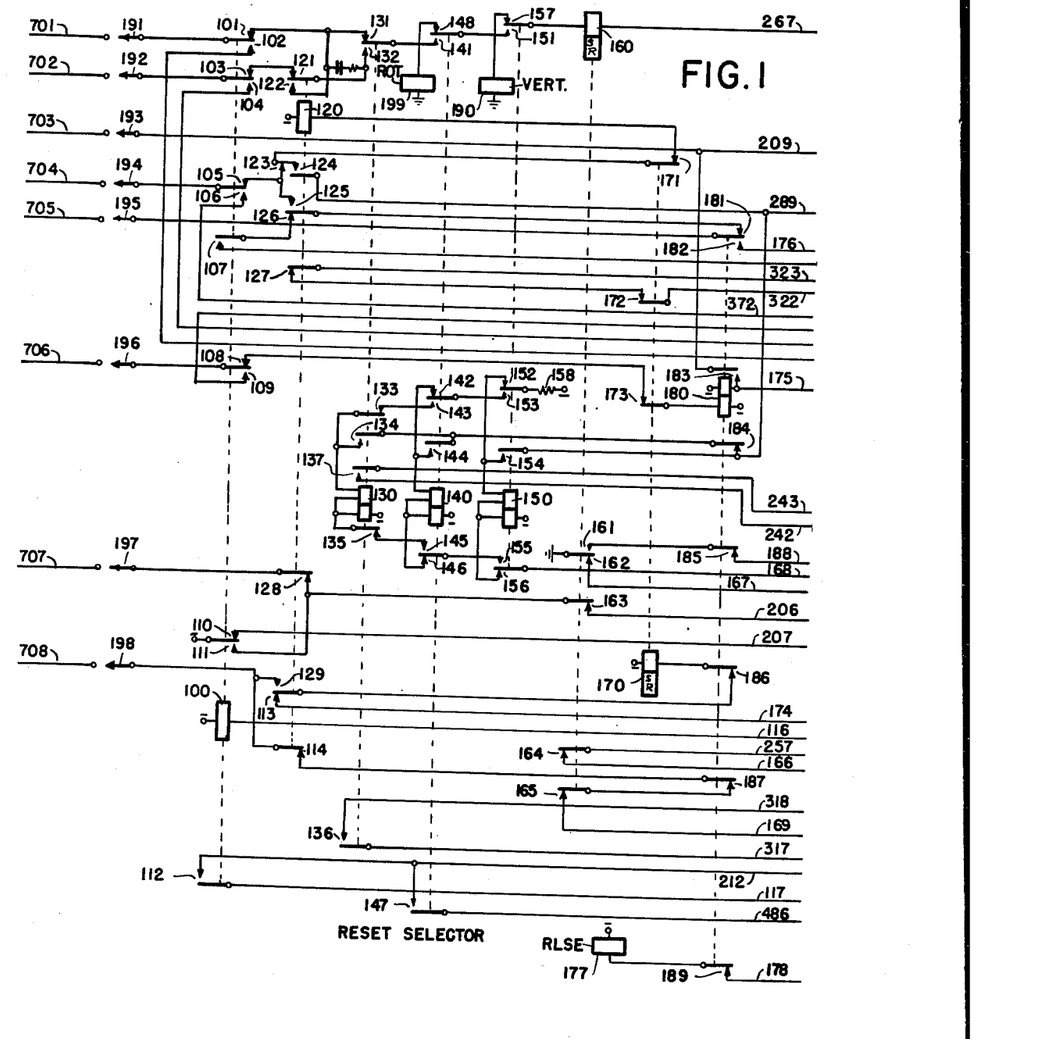

In order to reset all space indicators that correspond to a particular date, the supervisor in charge operates the locking Date Reset key, which is shown at the top of Fig. 2, and then operates dial 236 to position the wipers of the reset selector switch of Fig. 1 opposite the level of bank contacts corresponding to the particular date. Normally, no other manual operation is required to reset all space indicators of that date.

In response to the operation of the Date Reset key, ground is connected through contacts 233 and 262 to holding conductor 289, and also at contacts 233 the following circuit is closed to operate impulsing relay 310: ground thru contacts 233, dial 236, conductor 237, contacts 308 and winding of relay 310 to negative battery. The operating circuit of date reset relay 270 is completed from ground thru contacts 232, lower winding of relay 270, contacts 273, conductor 238 and contacts 312 to negative battery, and at contacts 313 an obvious circuit is completed for illuminating the reset seize lamp 332. Relay 270 prepares an impulsing circuit for the vertical stepping magnet of the reset selector at contacts 271, closes its locking circuit from ground thru contacts 232, lower winding of relay 270, contacts 272 and upper winding of relay 270 to negative battery, and at contacts 275 prepares a circuit for trouble relay 350 from conductor 277 thru contacts 275, conductor 278 and the lower winding of relay 350 to negative battery.

Conductor 277 is connected to a conventional timing device (not shown) for applying ground pulses at pre-determined intervals. In the event of trouble that delays the resetting operation, trouble relays 350 and 340 operate to give a trouble alarm. Upon operating thru its lower winding responsive to the first timed ground pulse received over conductor 277, relay 350 closes its locking circuit from negative battery thru contacts 313, upper winding of relay 350 and contacts 351 to ground, and at contacts 352 connects conductor 353 to the lower winding of relay 340. After a further time interval, ground is connected to conductor 353 to operate relay 340. A locking circuit is completed from negative battery thru the upper winding of relay 340, contacts 343 and contacts 345 of a manually operated switch to ground, lamp 346 is connected at contacts 342 to conductor 347 which is connected to a source of ground pulses which cause the lamp to flash, and ground is connected to conductor 354 at contacts 344 for sounding an alarm. The alarm continues until switch 345 is opened manually to release relay 340.

Upon observing the illumination of reset seize lamp 332, the operator dials the number corresponding to the date of the flights of which the indicators are to be reset to thereby cause the wipers to be raised in the reset selector banks to the level corresponding to the date. In response to the operation of the dial, the previously traced circuit of relay 310 is interrupted intermittently to transmit impulses. At contacts 313, the locking circuit of relay 350 is opened during each impulse to release trouble relay 350 in event that it has previously operated. At contacts 311, an impulsing circuit to operate the vertical magnet 190 to step the wipers of the reset selector and to operate slow-releasing transfer control relay 160 is completed from negative battery thru contacts 311, conductor 315, contacts 271, 265 and 251, conductor 267, winding of relay 160, contacts 157 and the winding of vertical stepping magnet 190 to ground.

The pulsing of vertical magnet 190 raises the switch wipers 191 to 198, inclusive, to the level corresponding to the number of digits in the first number dialed which in turn actuates vertical springs V. O. N. to close contacts 290 on the first step of the wipers to prepare a release circuit, and also raises vertical wiper 330 to the vertical bank contact corresponding to the selected wiper level to test for a busy condition. Relay 160, which operates on the first impulse of each series of impulses and which remains operated during the receipt of each series of digital impulses due to its slow-to-release characteristics, completes a circuit from ground thru contacts 161 and 165, conductor 188 and lower winding of slow-acting transfer-control relay 200 to negative battery. Relay 200 operates and at contacts 201 prepares the operating circuit of relay 150 and the operating circuit of relays 300 and 320, and at contacts 204 opens a point in the operating circuit of slow-to-release impulsing-control relay 170.

The engagement of any flight selector, that is, in a group corresponding to the same date as that of the selected level of the reset selector, delays the operation of the reset converter until all flight selectors of that group become idle. For example, assume that the first level of the reset selector has been selected, and that the flight selector of the reservation system, as shown in Fig. 26 of said co-pending application, corresponding to the first level is engaged, then, as relay 160 releases shortly after the first series of impulses ceases, the following circuit is completed to operate busy guard relay 250: negative battery thru the lower winding of relay 250, conductor 257, contacts 164, conductor 166, contacts 287, conductor 256, contacts 306, vertical wiper 330, vertical bank contact 331 and conductor 395 of cable 394 to ground at the flight selector. Upon operating, relay 250 opens a point in the impulsing circuit at contacts 251 to prevent further stepping of the selector switch, closes a locking circuit for relay 200 at contacts 253, opens the operating circuit of relays 300 and 320 at contacts 254 and opens a point in the operating circuit of impulsing-control relay 170 at contacts 255.

The locking circuit for relay 200 may be traced as follows: negative battery thru the upper winding of relay 200, contacts 221 and 253, conductor 259, contacts 302, conductor 309, contacts 201, conductor 167 and contacts 162 to ground. When all flight selectors corresponding to the selected date become idle, ground is removed from lead 395 and busy-guard relay 250 releases to close the impulsing circuit at contacts 251, to release transfer-control relay 200 and also to operate relays 300 and 320 over circuits traced subsequently.

After the busy-guard relay 250 releases, or if it does not operate, the reset converter operates automatically until all space reservation indicators for the selected date are reset to display the number of seats initially available on all flights for that date. Upon releasing after the first series of impulses, transfer-control relay 160 opens the operating circuit of slow-to-release transfer-control relay 200 at contacts 161 and also closes a circuit to energize the windings of transfer relay 150 and closes the operating circuit of relays 300 and 320 at contacts 162. The circuit for energizing the windings of relay 150 in opposition may be traced from ground thru contacts 162, conductor 167, contacts 201, conductor 168, contacts 156, and from contacts 156 through the lower winding of relay 150 to negative battery and, also from contacts 156, through the upper winding of relay 150, contacts 152 and resistor 158 to negative battery. Since the windings of relay 150 are energized in opposition, relay 150 does not operate until transfer-control relay 200 releases. Relays 300 and 320 are energized over the following circuit before relay 200 releases: ground thru contacts 162, conductor 167, contacts 201 and 254, conductor 266, contacts 305, conductor 314, contacts 276, conductor 316 and relays 320 and 300 to negative battery.

The windings of relays 300 and 320 are chosen such that relay 320 operates before relay 300. Relay 320 closes the following circuit to operate level busy relay 390: ground thru contacts 321, upper winding of relay 390, vertical contact 331, wiper 330, contacts 306, conductor 258, contacts 287, conductor 166, contacts 164, conductor 257 and lower winding of relay 250 to negative battery. The current flow in this circuit is limited by the resistance of the upper winding of relay 390 and is not sufficient to operate relay 250. Relay 390 connects its lower winding in series with the upper winding and negative battery at contacts 391 and at contacts 392, which are connected to conductors 396 and 397, opens a point in the circuit of the wiper 2631 of the flight selector shown in Fig. 26 of my co-pending application. Other contacts, such as contacts 393, open similar points in other flight selectors corresponding to the selected level to prevent the regular selectors from seizing connectors that have access to the particular date previously selected by the reset selector. Upon operating, relay 300, at make-before-break contacts 301 and 303, transfers the winding of the impulsing relay from the circuit controlled by dial 236 to a circuit controlled by impulsing control relay 170, transfers the operating circuit of relays 300 and 320 from the ground at contacts 162 to the holding ground on conductor 289 at make-before-break contacts 304 and 305, opens a point in the operating circuit of busy-guard relay 250 at contacts 306 and prepares the operating circuit of impulsing-control relay 170 at contacts 307. Impulsing relay 310 is now maintained operated over the following circuit: negative battery thru the winding of relay 310, contacts 301, conductor 322, contacts 172 and 127, conductor 323 and contacts 233 to ground.

Upon releasing, transfer-control relay 200, at contacts 201, opens the previously traced circuit for energizing the windings of transfer relay 150 in opposition, and at contacts 204 closes the following circuit to operate impulsing-control relay 170: negative battery thru relay 170, contacts 186 and 113, conductor 174, contacts 204 and 255, conductor 279, contacts 484, conductor 485 and contacts 307 to ground. When the initial energizing circuit for the windings of relay 150 is opened at contacts 201, the induced current in the closed circuit including negative battery thru the lower winding of relay 150, upper winding of relay 150, contacts 152 and resistor 158 changes the magnetic field sufficiently to cause the armature to close contacts 154. At contacts 154 the following circuit is completed for connecting the two windings in series to aid each other in fully operating the transfer relay 150: negative battery thru the lower winding of relay 150, upper winding and initially closed contacts 154 to ground on holding conductor 289. Upon completing its operation, relay 150, at contacts 152 and 153, transfers negative battery and resistor 158 from its initial energizing circuit to the upper winding of transfer relay 140, at contacts 155 and 156 transfers an incomplete energizing circuit from relay 150 to relay 140, and at contacts 157 and 151 transfers the impulsing circuit from vertical stepping magnet 190 to rotary stepping magnet 199.

Circuits have now been prepared for rotating wipers 191 to 198, inclusive, to engage the reset connector connected to the first bank contacts of the selected level. Upon operating, relay 170 opens the previously traced circuit to release impulsing relay 310 at contacts 172. The circuit for energizing rotary magnet 199 to step the wipers the first step may be traced from negative battery thru contacts 311, conductor 315, contacts 271, 265 and 251, conductor 267, relay 160, contacts 151 and 148 and rotary magnet 199 to ground. Relays 160 and 200 operate as previously described. Upon operating, relay 200 at contacts 204 opens the operating circuit of slow-release relay 170. Relay 170 releases to close, at contacts 172, the previously traced operating circuit of impulsing relay 310. Relay 310 operates and opens the circuit to relay 160 and the rotary magnet 199. Relay 160, upon releasing, closes the following circuit for energizing in opposition the two windings of transfer relay 140 which are connected in the manner previously described for relay 150: ground thru contacts 162, conductor 167, contacts 201, conductor 168, contacts 155 and 146, through the lower winding of relay 140 to negative battery and through the upper winding of relay 140, contacts 142 and 153 and resistor 158 to negative battery. Release of relay 160 also opens the circuit to relay 200. Relay 200 releases, opens the initial energizing circuit of relay 140 at contacts 201 and closes again the operating circuit of relay 170 at contacts 204. When the initial energizing circuit of transfer relay 140 is opened, contacts 144 are closed in a manner similar to that described for contacts 154 of relay 150 to complete the following circuit: negative battery thru the lower winding of relay 140, upper winding, contacts 144 and contacts 184 to ground on holding conductor 289. Upon completing its operation, relay 140 transfers the impulsing circuit from the rotary stepping magnet 199 of the reset selector to the vertical magnet 730 of the selected reset connector at contacts 148 and 141, transfers negative battery and resistor 148 from upper winding of relay 140 to transfer relay 130 at contacts 142 and 143, and transfers the incomplete energizing circuit from relay 140 to relay 130 at contacts 145 and 146.

Figure 7:
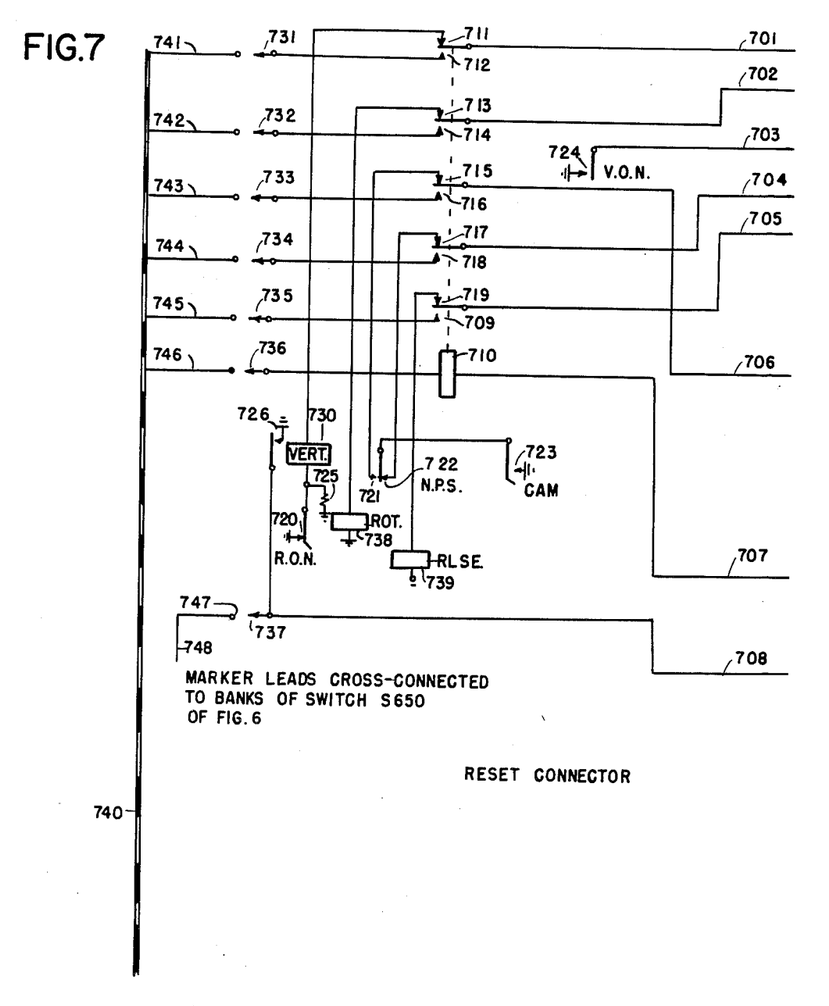

Circuits are now prepared for operating the selected reset connector, for example, Reset Connector of Fig. 7, that is connected to the first bank contacts in the selected level. Relay 170 operates to open relay 310 which releases to close the following circuit: negative battery thru contacts 311, conductor 315, contacts 271, 265 and 251, conductor 267, relay 160, contacts 151, 141, 131 and 101, wiper 191, the first bank contact of the selected level, conductor 701, contacts 711, vertical stepping magnet 730 and rotary off-normal springs 720 to ground. The single impulse transmitted to the vertical magnet positions rotary wipers 731 to 737, inclusive, opposite their respective bank contacts of the first level. Relay 160 operates on this pulse and closes relay 200. Relay 200 operates, prepares the energizing circuit to the two windings of relay 130 at contacts 201 and opens the circuit to relay 170 at contacts 204. Relay 170 releases and closes relay 310 which operates to release the vertical magnet 730 and relay 160. When relay 160 releases, the windings of transfer relay 130 are energized over the circuit including contacts 135 and 133, and, in response to the subsequent release of relay 200, operates fully over the circuit including contacts 134 in the manner previously described for relays 140 and 150.

Figure 8:
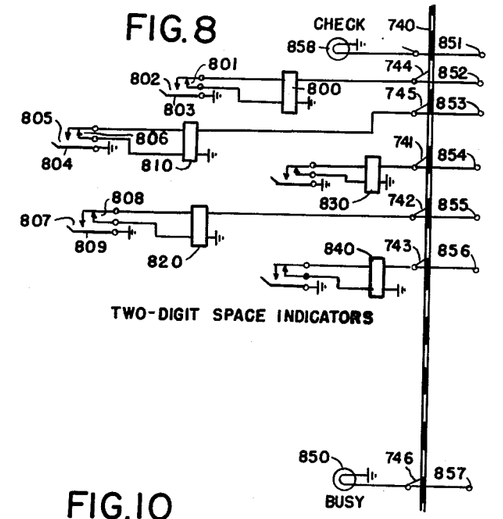
Fig. 8 shows the circuits for operating a group of two-digit space indicators. The indicators are accessible through the connector circuits of both the reset apparatus, as shown in this application, and the initial space reservation apparatus as shown in Fig. 26 of my said co-pending application.
Figure 9:
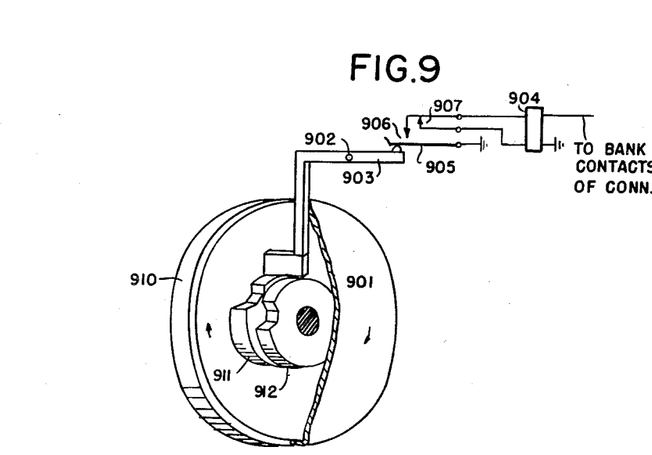

Relay 130 transfers the impulsing circuit from the vertical magnet 730 to the rotary magnet 738 at contacts 131 and 132, opens points in its initial energizing circuit at contacts 133 and 135 and prepares the following locking circuit which, at the conclusion of the next impulse, places the releasing of relay 200 under the control of busy-guard relay 250: negative battery thru the upper winding of relay 200, contacts 221 and 252, conductor 242, contacts 137, conductor 243, contacts 303, conductor 309, contacts 201, conductor 167 and contacts 162 to ground. Relays 170, 310, 160, and 200 operate again in the cycle previously described to send a single impulse over the circuit from negative battery to contacts 141, as previously traced, and now extended through contacts 132, 121, 103, wiper 192 and its respective bank contact conductor 702, contacts 713 and rotary magnet 738 to ground. The operation of the rotary magnet steps wipers 731 to 737, inclusive, to the first set of bank contacts on the first level to establish controlling connections with a maximum of five space indicators as illustrated in Fig. 8.

Assuming that the selected group of indicators, i. e. those connected to the first bank contact in the first level of the reset connector banks, are idle, the following circuit operations take place. When relay 160 releases after the first rotary impulse to Rot. magnet 738, it opens the original operating circuit to the lower winding of relay 200 at contacts 161 but closes a holding circuit to the upper winding of relay 200 at contacts 162 via contacts 137 to hold relay 200 operated, and closes the following operating circuit for relay 710 and busy-guard relay 240: ground through the busy lamp associated with the selected indicators, for example, lamp 850 of Fig. 8, conductor 746 of cable 740 and the respective bank contacts, wiper 736, relay 710, conductor 707 and its terminating bank contact, wiper 197, contacts 128 and 163, conductor 206, contacts 203, winding of relay 240, conductor 207 and contacts 110 to negative battery. Relay 240 operates and closes a circuit from ground thru contacts 241, conductor 166, contacts 164, conductor 257 and lower winding of relay 250 to negative battery. Relay 250 operates and opens the impulsing circuit at contacts 251, opens a point in the initial energizing circuit of relays 300 and 320 at contacts 254, opens the locking circuit of relay 200 at contacts 252 to cause its release, opens an additional point in the circuit of relay 170 at contacts 255, and closes the circuit at contacts 253 for both the upper winding of relay 250 and the winding of cut-in relay 100.

Connect relay 710 operates, disconnects the vertical stepping magnet 730 from its impulsing circuits at contacts 711, disconnects the rotary stepping magnet 738 at contacts 713, opens a point in the circuits controlled by normal post springs N. P. S. at contacts 715 and 717, opens a point in the circuit to the release magnet 739 at contacts 719, and at each of the contacts 712, 714, 716, 718, and 709 connects an impulsing circuit to a different one of the space reservation indicators of Fig. 8.

Assuming that the selected group of indicators are already engaged by a regular connector, negative battery through a low resistance circuit of the regular converter is standing on the circuit of busy lamp 850. This low resistance circuit to battery causes a reduction in the value of the current which would normally flow in the above traced circuit to relays 710 and 240, and, when relay 160 releases and closes the circuit to these relays 710 and 240, they remain unoperated. Relay 200 is held operated through its upper winding from contacts 162 and in turn holds the circuit to relay 170 open at contacts 204 to prevent further stepping of the reset connector switch. The reset converter "camps" on the busy group of indicators until the indicators are no longer engaged by a regular connector and then, in response to the removal of the above-mentioned low resistance circuit, relay 240 operates, as previously described, to close the above-traced operating circuit to relay 250.

The locking circuit thru the upper winding of relay 250 may be traced from negative battery thru the upper winding, contacts 256, conductor 279, contacts 484, conductor 485 and contacts 307 to ground and the circuit to operate cut-in relay 100 may be traced from negative battery thru relay 100, conductor 116 and contacts 256 to ground. Relay 100 prepares an impulsing circuit for each of the five selected space indicators at contacts 102, 104, 106, 107 and 109, completes a circuit traced subsequently for operating pick-up relay 540 at contacts 112, opens the energizing circuit of relay 240 at contacts 110, and at contacts 111 maintains a circuit from negative battery thru the winding of relay 710, conductor 746 and busy lamp 850 to ground. This negative battery from conductor 746 to bank contacts of regular connectors renders the indicators busy thereto. Relay 240 releases.

Circuits for polarizing cut-off relays 360, 370, 380, 400, and 410, and also for starting vibrator 530, which generates controlling impulses, are completed when the Date Reset key is first operated. A circuit for polarizing the cut-off relays may be traced from ground thru contacts 233 and 262, conductor 289, resistor 362, polarizing windings of relays 360, 370, and 380, conductor 382 and upper windings of relays 400 and 410 to negative battery. A circuit is also completed to operate impulsing relays 550 and 560 as follows; ground on holding conductor 289 thru contacts 545, resistor 547, lower winding of relay 550 and lower winding of relay 560 to negative battery. Relay 550 opens a point in an incomplete operating circuit for stepping magnet M650 at contacts 553; and relay 550, at contacts 551 and 552, and relay 560, at contacts 561, 562 and 563, open points in impulsing circuits that are later extended to the five selected space indicator circuits by the previously described operation of cut-in relay 100. Finally, in response to the ground on conductor 289, a circuit for energizing the upper windings of vibrator 530 is completed through contacts 513, contacts 525 and resistor 527 connected in parallel with resistor 528, and upper windings to negative battery. The vibrator pendulum is attracted to close a circuit from negative battery thru contacts 531 and 523, lower winding of relay 520 and contacts 511 to ground on holding conductor 289. Relay 520 closes its locking circuit at contacts 521 from negative battery through the upper winding to holding conductor 289, opens its initial operating circuit at contacts 523, completes a circuit for energizing the lower windings of the vibrator at contacts 522 and 525, disconnects starting resistor 527 from in parallel with resistor 528 at contacts 526 to reduce the current flow in the upper windings of the vibrator, and completes the circuit for energizing slow-operating relay 510 at contacts 524. Upon operating, relay 510 opens a further point in the initial operating circuit of relay 520 at contacts 511, prepares a circuit for operating pick-up relay 540 at contacts 514, and at make contacts 512 connects ground through contacts 524 to the circuit for holding the upper windings of the vibrator energized while disconnecting the holding conductor 289 from this circuit at break contacts 513.

The magnetizing force of the lower windings of the vibrator, which were closed from contacts 531 by operation of relay 520, is in opposition to that of the upper windings to cause the pendulum to swing away from the coils, closing contacts 532 and opening the circuit to the lower windings of the vibrator magnets. Opening of the lower windings causes the pendulum to swing back to close contacts 531. This vibrator will continue to vibrate and cause alternate closing of contacts 531 and 532 as long as relay 520 remains operated.

Shortly after cut-in relay 100 operates as previously described, slow-acting relay 200 releases in response to the previously described operation of relay 250. The circuit that is now completed for operating pick-up relay 540 may be traced from negative battery connected to the vibrating pendulum thru contacts 532, 514 and 544, upper winding of relay 540, conductor 546, contacts 473 and 462, conductor 486, contacts 147 and 112, conductor 117 and contacts 205 to ground on holding conductor 289. Relay 540, at contacts 541, closes its locking circuit from battery thru its lower winding and contacts 541 to conductor 546 which is connected to ground by the previously traced circuit, prepares an impulsing circuit for stepping magnet M650 at contacts 542, opens the initial energizing circuits of impulsing relays 550 and 560 at contacts 545 and closes a circuit to place the impulsing relays 550 and 560 under control of the vibrator at contacts 543, and opens the circuit for initially energizing relay 540 at contacts 544. The circuit for controlling the impulsing relays may be traced from battery on the pendulum of the vibrator, contacts 532, 514, and 543, upper windings of relays 550 and 560, conductor 486, contacts 147 and 112, conductor 117 and contacts 205 to ground on holding conductor 289. The vibrator causes relays 550 and 560 to pulse and in turn open and close contacts 551, 552, 561, 562 and 563 to send impulses over five individual circuits to the magnets of the space reservation indicators of Fig. 8. For example, an impulsing circuit may be traced from negative battery thru impulsing contacts 561, conductor 564, contacts 452, conductor 454, operating winding of cut-off relay 370, conductor 372, contacts 106, wiper 104, conductor 704, contacts 718, wiper 734, conductor 744 of cable 740, upper winding of indicator magnet 800, contacts 801 and the lower winding of the indicator magnet to ground. Likewise, similar circuits may be traced from contacts 562, 551, 563, and 552, to operate space indicator magnets 840, 820, 810 and 830, respectively. Impulses are sent over each individual impulsing circuit until both drums of the respective indicators display "9." For example, when the drums of the indicator associated with magnet 800 display "99," the cam spring 803 is actuated to close contacts 802 and to open contacts 801. At contacts 803, the upper winding of indicator magnet 800 is connected directly to ground, and at contacts 801 the lower winding is disconnected from the circuit. The decreased resistance and resultant increased current in this impulsing circuit causes the operation of polarized cut-off relay 370 which, at contacts 371, closes an operating circuit to its associated control relay 450. Relay 450, at contacts 451, closes its locking circuit, opens the previously traced impulsing circuit to indicator magnet 800 at contacts 452, and at contacts 453 closes a point in the chain circuit which is connected to the winding of relay 470. The operating circuit of relay 450 may be traced from negative battery thru the winding of relay 450, conductor 373, contacts 371, conductor 374 and contacts 501 to ground on holding conductor 289. Likewise, when the indicators associated with magnets 810, 820, 830 and 840 display "99," cutoff relays 360, 400, 410, and 380, respectively, operate to close operating circuits at contacts 361, 401, 411, and 381. If less than five indicators are connected to any set of contacts in the connector bank, the spare contacts are connected to ground potential for operating the corresponding cut-off relays as soon as any of the five impulsing circuits are connected to the spare contacts. Relays 460, 430, 420, and 440 operate to cut-off the impulsing circuits, and at contacts 463, 433, 423, and 443, respectively, close the operating circuit of slow-releasing relay 470. Each of the cut-off relays 370, 360, 400, 410, and 380 releases after its associated control relay has operated. Upon operating, slow-release relay 470 closes its locking circuit at contacts 471 and closes a circuit from ground on holding conductor 289 thru contacts 472, conductor 474 and winding of slow-releasing relay 500 to negative battery. Relay 500, at contacts 501, opens the locking circuits of relays 420, 430, 440, 450, and 460, all of which release to connect again the five impulsing circuits to the same group of five indicator magnets, and closes the following circuit to place stepping magnet M650 under the control of impulsing relay 550; negative battery thru winding of stepping magnet M650, conductor 642, and contacts 505, 553 and 542 to ground at holding conductor 289. Also, relay 500 prepares marking circuits through banks of switch S650 at contacts 503 and 504.

The five indicators and the rotary switch S650 step together under control of relays 550 and 560 until the selected indicators display the correct number of seats initially available in the particular flight. The numbers to be displayed on each set of indicators when they are finally reset are determined by a marking circuit that is connected from a corresponding bank contact, for example, contact 747 of the reset connector of Fig. 7, to a contact in the banks of switch S650. One contact in one of the bank levels 656 to 659 and another contact in one of the levels 652 to 655 is available for each number that can be displayed. The marking circuit for a set of indicators which is the first or intermediate set to be selected in a flight group includes a contact in one of the levels 656 to 659 while the marking circuit for a set of indicators which is the last, or only, set to be selected in a flight group includes a contact in one of the levels 652 to 655. When a marking circuit is completed through a contact in one of the levels 652 to 655, relay 220 is operated to release the reset converter as subsequently described, but is effective to release the reset converter only if the Flight Reset key rather than the Date Reset key has been operated. When the first impulse is transmitted to the indicator magnets 800 to 840 and to magnet M650 from relays 550 and 560 after the operation of relay 500, the display on each of the engaged indicators is changed from "99" to "98" and the wipers of rotary switch S650 are stepped from the first or normal position to the second position, contacts of off-normal springs 650 closing on this first step to complete the following circuit for operating relay 600: negative battery thru relay 600, conductor 602, contacts 574, off-normal springs 650 and contacts 503 to ground. At contacts 601 of relay 600, a circuit is prepared for operating relay 570 which at this time is short-circuited by the off-normal springs 650. During each one-half revolution of the wipers of switch S650, a different one of the wipers 666 to 669, inclusive, is connected thru to relays 570 and 600 in series and also a different one of the wipers 662 to 665, inclusive, is connected thru to relay 220. During the first twenty-four impulses, while the display drums of the indicators are stepped from "99" to "75," ground potential is connected through contacts 503 and 571 and conductor 577 to wiper 669, and also through the winding of relay 220, conductor 223 and contacts 504 and 576 to wiper 662. If the marking circuit of the engaged indicators is not located in the contact banks associated with wiper 669 and wiper 662, then, on the twenty-fifth impulse when the wipers are again positioned on the first contacts of the banks, off-normal springs 650 are opened momentarily to disconnect the short-circuit from across the winding of relay 570. Relay 570 operates in series with relay 600 over the following circuit: negative battery thru the winding of relay 600, conductor 602, winding of relay 570, conductor 579, contacts 601, conductor 603 and contacts 593 to ground. Relay 570 transfers ground from wiper 669 to wiper 668 at contacts 571 and 572, transfers ground from wiper 662 to wiper 663 at contacts 576 and 575, and transfers the control circuit including the off-normal springs from relay 600 to relay 620 at contacts 573 and 574. When the next impulse is transmitted, off-normal springs complete the circuit from ground potential through contacts 573, conductor 604, contacts 614 and the winding of relay 620 to negative battery. Relay 620 operates and at contacts 621 prepares the operating circuit for relay 610 which at this time is short-circuited at off-normal springs 650. If the marking circuit from the engaged indicators is not located in the contact banks associated with wipers 668 and 663, at the end of the second one-half revolution when the indicators display "50," relay 610 operates in a manner similar to that previously described for relay 570, transfers ground from wiper 668 to wiper 667 at contacts 611 and 612, transfers ground potential from wiper 663 to wiper 664 at contacts 616 and 615, and transfers the controlling circuit from relay 620 to relay 640 at contacts 613 and 614. At the beginning of the third one-half revolution of the wipers, relay 640 operates and at contacts 641 prepares a circuit for operating relay 630. If it is assumed that "22" is to be displayed on the indicators, the marking circuit is not encountered during the third one-half revolution and relay 630 operates and at contacts 631 and 632 transfers ground potential from wiper 667 to wiper 666, and at contacts 635 and 634 transfers ground potential from wiper 664 to wiper 665. Providing the marking circuit of the selected indicators is connected to the third contact of level 656, the wipers are stepped until wiper 666 encounters the third bank contact at which time a circuit is completed from ground thru 632, third contact of bank 656, conductor 748, bank contact 747, wiper 737, conductor 708, wiper 198 of the reset selector, contacts 114, 187 and 165, conductor 169 and the winding of relay 210 to negative battery. Cut-off relay 210 operates and at contacts 211 closes the following circuit to operate relay 480 and to maintain impulsing relays 550 and 560 operated: negative battery thru the lower winding of relay 560, lower winding of relay 550, conductor 554, lower winding of relay 480, conductor 487, contacts 211, conductor 212, contacts 112, conductor 117 and contacts 205 to ground potential on conductor 289. Relay 480 operates and opens the circuit to relay 100 at contacts 484 which restores and opens the impulsing circuits to the indicators.

If the entire flight is displayed on the selected set of indicators, the cross-connecting conductor 748 would be connected to the third contact in level 655 rather than in level 656, and the marking circuit would be completed from ground thru the winding of relay 220, conductor 223, contacts 504 and 575, conductor 565, contacts 615 and 634, wiper 665, third contact of bank 655, conductor 748, bank contact 747, wiper 737, conductor 708, wiper 198, contacts 114, 187 and 165, conductor 169 and the winding of relay 210 to negative battery. Although relay 220 would operate in series with relay 210, it performs no function at this time.

Each of the engaged indicators now displays the number of seats initially available between two stops of the flight. Relays for controlling impulsing circuits are restored to normal, and the wipers of the reset connector are rotated to the next set of bank contacts to prepare impulsing circuits for the next set of space indicators that are to be reset as will now be described. Relay 480 operates, opens the locking circuit of slow-release relay 470 at contacts 483, opens the circuits of relay 250 and the circuit of cut-in relay 100 at contacts 484 as previously stated, at contacts 481 closes its locking circuit through conductor 488 to ground on wiper 661, and at contacts 482 opens the energizing circuit to the lower winding of relay 540. Relays 250, 100 and 540 release followed by relay 470. Relay 100 opens the initial operating circuit of relay 480 at contacts 112 and opens a circuit to release relay 710 at contacts 111. Relays 710 and 100 prepare the previously traced impulsing circuit for the rotary stepping magnet of the reset connector. Relay 540, at contacts 543 and 544, transfers the circuit including the oscillating pendulum from the impulsing relays 550 and 560 to the open circuit of the pick-up relay 540, closes a previously traced circuit for maintaining relays 550 and 560 operated at contacts 545, and at contacts 542 opens a point in the previously traced impulsing circuit of switch S650. Upon releasing, relay 470 opens the energizing circuit of slow-releasing relay 500 at contacts 472. After an interval, relay 500 releases and at contacts 503 opens the energizing circuit of relays 570, 600, 610, 620, 630, and 640, and prepares the circuits of relays 420, 430, 440, 450, and 460 at contacts 501, opens the energizing circuit of relay 220 at contacts 504, and at contacts 506 closes the following circuit to return the wipers of switch S650 to the normal position on the first bank contacts of the levels: ground thru contacts of level 651, wiper 661, interrupter contacts J650, conductor 489, contacts 506, conductor 642 and stepping magnet M650 to negative battery. The switch steps in self-interrupting manner until wiper 661 encounters the open circuit at the first contact of switch level 651. Also, at the first position, the locking circuit of relay 480 is opened. Relay 480 releases and at contacts 484 closes the circuit for again operating impulse-control relay 170 to start the previously described sequence of operation to send a single impulse to rotary magnet 738; that is, relay 310 releases, relay 160 operates, the wipers of the reset connector are stepped rotary to the second set of contacts in the first level, relay 200 operates, relay 170 releases, relay 310 operates, relay 160 releases, relays 240 and 710 operate over the busy lamp circuit of the second set of indicators, relays 250 and 190 operate, relay 200 releases, and pick-up relay 540 operates to complete circuits for sending impulses to the second set of space indicators in the manner previously described for the first set. The second set are all returned to "99" and then switch S650 is again caused to operate to reset the second set of space indicators to the number indicating the number of seats initially available.

This system continues to operate automatically in a manner similar to that previously described until all space indicators which are connected in the first level of the engaged reset connector are each reset to display the number of seats initially available. On the eleventh rotary step of the reset connector, cam springs CAM of the reset connector are closed to prepare the following circuit for relay 120: ground thru contacts 723, 722 and 717, conductor 704, wiper 194, contacts 105, 123 and 171 and winding of relay 120 to negative battery. When relay 170 releases immediately after the wipers reach the eleventh position, the circuit is completed at contacts 171 to operate relay 120. Relay 120 connects its energizing circuit to ground conductor 289 at contacts 124, opens its initial energizing circuit at contacts 123, opens an additional point in the circuit of impulsing relay 310 at contacts 127, prepare a circuit for relay 170 including interrupter springs 726 of vertical magnet 730 at contacts 129, opens a point in the operating circuit of relay 240 at contacts 128, completes a circuit for operating release magnet 739 at contacts 125, and at contacts 122 transfers the closed impulsing circuit from rotary magnet 738 to vertical magnet 730. The circuit for operating the release magnet 739 may be traced from negative battery thru the winding of release magnet 739, contacts 719, conductor 705, wiper 195, contacts 181, 125 and 105, wiper 194, conductor 704 and contacts 717, 722 and 723 to ground. The circuit closed at contacts 122 to partially energize vertical magnet 730 is as follows: negative battery thru contacts 311, conductor 315, contacts 271, 265 and 251, conductor 267, relay 160, contacts 151, 141, 132, 122 and 101, wiper 191, conductor 701, contacts 711, vertical magnet 730, and resistor 725 to ground, the R. O. N. contacts 720 being open at this time. When the release magnet operates, the wipers 731 to 737 return in the well known manner to the normal rotary position while the partial energization of the vertical stepping magnet positions the vertical pawl against the vertical ratchet to maintain the wipers at the same level upon clearing the switch banks. Also, when the wipers begin their rotary-return action, cam springs CAM are actuated to open, at contacts 723, the energizing circuit of the release magnet 739. As the wipers move from rotary position 1 to the normal rotary position, rotary off-normal springs R. O. N. are actuated to close, at contacts 720, a short-circuit across resistor 725, thus to increase the current flow in the winding of vertical stepping magnet 730.

The wipers are stepped vertically one step to the second level and vertical interrupter springs 726 operate to close the following circuit for operating relay 170: ground thru contacts 726, conductor 708, wiper 198, contacts 129 and 186 and relay 170 to negative battery. Relay 170, at contacts 171, opens the circuit of relay 120 which, upon releasing, opens the energizing circuit of vertical magnet 730 at contacts 122 and closes the previously traced circuit at contacts 121 to energize rotary magnet 738. The wipers are stepped to the first bank contacts of the second level. When the vertical magnet is deenergized, the circuit of slow-releasing relay 170 is opened at vertical interrupter spring contacts 726; and upon releasing relay 170 recloses the energizing circuit of impulsing relay 310 at contacts 172. The rotary stepping magnet 738 is deenergized. The sequence of operations for resetting the space indicators that are connected in the second level of bank contacts continues in the same manner as previously described for resetting the indicators connected on the first level. Also, the indicators connected in the remaining eight levels are reset in a similar manner.

After all the indicators that are accessible to the reset connector of Figure 7 have been reset, the wipers 191 to 198 of the reset selector Figure 1 are rotated to the next set of bank contacts to connect with another reset connector as will now be explained. When the wipers 731 to 737 of the previously selected reset connector are stepped to the tenth level of bank contacts, normal post springs N. P. S. are actuated to open contacts 722 and to close contacts 721. On the eleventh rotary step on this tenth level the CAM springs are operated. The operation of the CAM springs closes a circuit from ground thru contacts 723, 721 and 715, conductor 706, wiper 195, contacts 108 and 173 and lower winding of relay 180 to negative battery. Relay 180 operates and closes the following locking circuit to hold itself operated until the wipers of the reset connector have returned to normal: negative battery thru contacts 183, wiper 193, conductor 703 and contacts 724 of vertical off-normal springs V. O. N. to ground.

During its operation, relay 180 releases transfer relays 130 and 140 at contacts 184, opens the energizing circuit of slow-acting relay 200 at contacts 185, opens a point in the circuit of slow-releasing relay 170 at contacts 186, opens a point in the operating circuit of relay 210 at contacts 187 and prepares a circuit for operating the release magnet 739 of the reset connector at contacts 182.

Relay 140 restores and reconnects the impulsing circuit which is controlled by relay 310 to the rotary magnet 199 of the reset selector at contacts 148, and at contacts 147 opens a point in the operating circuit of relay 480. Relay 170 releases, relay 310 operates, and relay 160 releases in the manner previusly described. When relay 160 releases, the circuit for operating release magnet 739 is closed from negative battery thru the winding of release magnet 739, contacts 719, conductor 705, wiper 195, contacts 182, conductor 176, contacts 202, conductor 167 and contacts 162 to ground. When wipers 731 to 737 return to their normal position, vertical off-normal springs V. O. N. are actuated to open, at contacts 724, the holding circuit of relay 180. Relay 180 restores and at contacts 182 opens the energizing circuit of release magnet 739, and at contacts 186 recloses the operating circuit of relay 170. The operation of relay 170 starts the previously described sequence of operations for energizing rotary magnet 199 to thereby step wipers 191 to 198 to the second set of contacts of the previously selected level. The reset converter continues its operation and controls the newly selected reset connector and its associated space indicators in exactly the same manner as previously described for controlling the reset connector of Figure 7 and its associated space indicators. After the space indicators that are connected to the second reset connector are reset to show the initially available seating space, other reset connectors, similar to Reset Connector, Figure 7, that are of the same date and that are connected in the same level in the contact of the reset selector are selected automatically in sequence, and thereby all space indicators for one date are automatically reset.

After all indicators for a date have been reset, audible and visual signals are given until the Date Reset key is restored manually to return all converted circuits to normal as will now be explained. As wipers 191 to 198 move off the tenth set of contacts when the resetting operation has been completed, cam springs CAM of the selector are actuated to connect in series relays 190 and 260 in the following circuit to operate release relay 260 only; negative battery thru the upper winding of relay 190, conductor 175, contacts 208 of cam springs CAM, upper winding of relay 260 and contacts 290 of vertical off-normal springs V. O. N. to ground. Relay 260 closes its locking circuit and also closes a circuit for illuminating signal lamp 346 at contacts 261, removes ground from holding conductor 289 at contacts 262, places ground on conductor 263 to operate an audible signalling device (not shown) at contacts 264, opens a point in the impulsing circuit at contacts 265 and closes the following circuit at contacts 269 to operate release magnet 177: ground thru contacts 269, conductor 178, contacts 189 and the winding of release magnet 177 to negative battery. In response to the operation of the release magnet, wipers 701 and 708 return to normal, and cam springs CAM and vertical off-normal springs V. O. N. are then actuated to open contacts 208 and 290, respectively. The removal of ground from conductor 289 stops the operation of vibrator 530, removes the bias from relays 360, 370, 380, 400, and 410, and releases relays 150, 300, 320, 520, 550, and 560. Relay 300 opens the energizing circuit of relay 170 at contacts 307, relay 320 opens a circuit to release relay 390 at contacts 321, and relay 520 opens the energizing circuit of relay 510 at contacts 524. Upon observing the audible and visual signals for indicating the completion of the resetting operation, the operator restores the Date Reset key which opens a circuit to release relay 270 at contacts 232, and opens the locking circuit of relay 260 and also opens a circuit to extinguish lamp 346 at contacts 233. Relay 260 restores and opens the circuit of release magnet 177 at contacts 269 and opens the circuit of the audible signal device at contacts 264. This completes the restoration of the reset converter.

To reset the indicators that correspond to only one flight of a particular date, the Flight Reset key is operated and then four digits are dialed. The first digit, which corresponds to the date, determines the level to which the wipers of the reset selector are stepped; the second digit, which is the first digit of the flight number, controls the rotary stepping of the reset selector; and the remaining two digits, which are the last two digits of the flight number, control the vertical and rotary stepping of the selected connector.

The operation of the Flight Reset key closes a circuit from ground at contacts 235 to holding conductor 289, and at contacts 234 prepares an operating circuit for relay 280. In response to the application of ground potential to conductor 289, the circuits are completed as previously described to enerzige the biasing windings of relays 360, 370, 380, 400 and 410; to operate relays 520, 510, 550 and 560, to start vibrator 530, and to operate impulsing relay 310. Relay 310 completes a circuit to illuminate lamp 332 and also prepares the alarm circuit as previously described at contacts 313, and completes the following circuit to operate flight reset relay 280 at contacts 312: negative battery thru contacts 312, conductor 236, contacts 283, lower winding of relay 280 and contacts 234 to ground. Relay 280 prepares the impulsing circuit at contacts 281, completes its locking circuit at contacts 282, opens its initial energizing circuit at contacts 283, prepares a release circuit at contacts 284 including the upper winding of release relay 260 and the upper winding of relay 230, opens a point in a subsequently described operating circuit of release relay 260 at contacts 285, connects the lower winding of trouble relay 350 to conductor 277 at contacts 286, prepares a circuit for operating relay 300 at contacts 288 and opens a point in the circuit to vertical wiper 330 at contacts 287.

Upon operating, flight reset relay 280 does not prepare certain previously described busy circuits that are prepared when date reset relay 270 is operated. Since the operating circuit of relay 320 now remains open at contacts 276 of relay 270, relay 320 is not operated as previously described. Therefore, the circuits of level busy relay, such as relay 390, are not prepared, and the relays remain unoperated to permit regular selectors to have access to indicators that are in the same date group as that selected by the reset selector. Furthermore, since the circuit of busy-guard relay 250 is open at contacts 287, the circuit arrangement for delaying the rotary operation of the reset selector while any flight selector corresponding to the selected date is engaged, is ineffective.

After operating the Flight Reset key, the operator manipulates the dial to transmit the first digit. The wipers 701 to 708 are raised to the level corresponding to the digit dialed, and relays 160 and 200 are operated in the manner previously described. The impulsing circuit differs from the circuit previously traced for operating the vertical magnet only in that the circuit now includes contacts 281 rather than contacts 271. At the conclusion of the series of impulses, slow-releasing relay 160 releases and then relay 200 releases to operate transfer relay 150 in the manner described for the date resetting operation. The operation of the reset converter at this time differs from that of the previous description in that the open circuit at contacts 276 prevents the automatic operation of impulsing relay 310.

In response to dialing the second digit, rotary magnet 199 steps wipers 701 to 708 to the set of contacts for seizing the desired reset connector, for example the Reset Connector of Figure 7. Upon releasing at the conclusion of the second digit, relays 160 and 200 complete the operation of transfer relay 140, which connects the impulsing circuit to vertical magnet 730.

Vertical magnet 730 of the reset connector receives the third series of dialed impulses to raise wipers 731 to 737 to the level corresponding to the third digit dialed.

Transfer relay 130 operates at the conclusion of the transmission of the third digit in the manner previously described and, in addition to transferring the impulsing circuit to the rotary magnet 738, prepares a circuit for operating relay 300 at contacts 136.

When the fourth digit is dialed, rotary magnet 738 is energized to step the rotary wipers to a corresponding set of bank contacts, the set being connected to space indicators that are to be reset. When relay 160 releases but before relay 200 releases the following circuit is closed to operate relay 300: negative battery thru the winding of relay 300, conductor 317, contacts 136, conductor 318, contacts 288, conductor 314, contacts 305, conductor 266, contacts 254 and 201, conductor 167 and contacts 162 to ground. Relay 300 transfers its operating circuit to holding conductor 289 at contacts 304, disconnects the initial controlling circuit from impulsing relay 310 at contacts 308 and connects a previously traced circuit which is controlled by relay 170 at contacts 301, closes a previously traced locking circuit for maintaining relay 200 operated at contacts 303, and prepares an operating circuit for relay 170 at contacts 307.

If the selected space indicators, as illustrated in Figure 8, are engaged by a regular connector, negative battery is applied to conductor 146 through circuits of the regular connector. The negative battery applied through the regular connector circuits shunts relay 240 and thus prevents its immediate operation. When the indicators are no longer engaged by the regular reset connectors, relay 240 operates over the previously traced circuit including the busy lamp 850 and ground. The resetting operation continues exactly as previously described until all space indicators of the selected flight are reset to read the initial spaces available.

When all the indicators of the flight have been reset, relay 220 is operated as previously described. However, now relay 220, at contacts 222, completes the release circuit which has been prepared at contacts 284 of flight reset relay 280. Relays 180 and 230 operate over the following circuit: negative battery thru the upper winding of relay 180, conductor 175, contacts 222, upper winding of relay 230, contacts 284, conductor 269, wiper 193, conductor 703 and contacts 724 of vertical off-normal springs V. O. N. to ground. Release relay 260 is short-circuited to prevent its operation until the connector has restored to normal. Relay 180 closes an obvious locking circuit to conductor 209 at contacts 183, opens an additional point in the circuit of release magnet 177 at contacts 189 and completes a previously traced circuit for operating release magnet 739 at contacts 182. Relay 230 closes a circuit to ensure the subsequent operation of relay 260 at contacts 231. When wipers 731 to 737 of the reset connector return to normal, vertical off-normal springs V. O. N. are actuated for opening contacts 724 to thereby remove the short-circuit from relay 260. Since relay 180 has a low resistance upper winding, it may not remain operated through the circuit which includes the relatively high resistance of the upper winding of relay 260. In response to the opening of the short-circuit, the following circuit is effective to operate relay 260: ground thru contacts 290 of the selector vertical off-normal springs, upper winding of relay 260, contacts 284 and 231 and the lower winding of relay 230 to negative battery. Upon operating, relay 260 closes circuits for signalling the operator as explained above, closes the circuit to release magnet 177 at contacts 268, and by removing ground from holding conductor 289 at contacts 262 causes the release of relays as previously described. When the operator restores the Flight Reset key, the energizing circuit of relay 280 is opened at contacts 234 and the circuit to restore relay 260 and also to extinguish lamp 346 is opened at contacts 235. Relay 260 opens the circuit of release magnet 177 at contacts 269 and opens the circuit of the audible signal device at contacts 264 to indicate that all circuits of the reset converter are restored to normal.

While there has been described what is at present considered to be the preferred embodiment of the invention, it will be understood that various modifications may be made therein, and it is intended to cover in the appended claims all such modifications as fall within the true spirit and scope of the invention.

Having described my invention in detail, what I claim and desire to have protected by issuance of Letters Patent of the United States is:

1. In an indicating system, a plurality of indicators each having a plurality of positions and each having a means for operating it individually, control means common to all of said indicator operating means for operating said means simultaneously, means associated with each of said indicators and each operated responsive to movement of its associated indicator in a restoring operation to an identical predetermined position for disabling the indicator operating means associated therewith to thereby stop the restoring movement of the associated indicator, restoring means common to all of said disabling means and operated thereby only in response to all of said disabling means being operated during said restoring operation to restore said disabling means to thereby enable all of said indicator operating means for a resetting operation, said control means again operating all of said indicator operating means in a resetting operation to move all said indicators simultaneously, and means common to all said indicators for disabling all of said indicator operating means simultaneously during the resetting operation when all said indicators have each simultaneously reached a second identical predetermined position.

2. In an indicating system, a plurality of step-by-step indicators each having a plurality of positions and each having impulsing means for stepping it individually responsive to impulses, control means common to all of said impulsing means for transmitting impulses to said impulsing means for stepping said indicators simultaneously, means associated with said indicators and each operated responsive to the stepping of its associated indicator in a restoring operation to an identical predetermined position for disabling said impulsing means associated therewith to thereby stop the stepping of the associated indicator for such restoring operation, restoring means common to all of said disabling means and operated thereby only in response to all of said disabling means being operated during said restoring operation to restore said disabling means to thereby enable all of said impulsing means for a resetting operation, said control means transmitting impulses to said impulsing means to again step said indicators simultaneously in a resetting operation, and means common to all said indicators for disabling all of said impulsing means simultaneously during the resetting operation when all said indicators have each simultaneously stepped to a certain identical predetermined position.

3. In an indicating system, a plurality of indicators each having a plurality of positions including a normal position and each having a means for operating it individually, a switch having a plurality of positions including a normal position each corresponding to a position of the indicators, control means common to said indicator operating means for operating said means simultaneously to thereby move said indicators simultaneously in a restoring operation, disabling means associated with said indicators, each of said disabling means operated during its restoring movement in response to its associated indicator reaching its normal position for disabling the indicator operating means associated therewith to thereby stop the restoring movement of the associated indicator, normally disabled means for operating said switch under control of said control restoring means, means common to all of said disabling means and operated thereby only in response to all of said disabling means being operated by all said indicators reaching their normal positions to restore said disabling means to thereby enable all of said indicator operating means for a resetting operation and to also enable said normally disabled switch operating means, said control means again operating all of said indicator operating means and also operating said switch operating means to move said indicators in a resetting operation from said normal position and said switch in a hunting operation from its normal position simultaneously, means common to said indicators for disabling all of said indicator operating means simultaneously during the resetting operation, and means controlled by said switch reaching a predetermined position in its hunting operation for operating said common disabling means to thereby simultaneously stop said indicators in their resetting operations at their corresponding positions.

4. In an indicating system, a plurality of indicators each having a plurality of positions to which it may be stepped and each having an individual pulsing circuit for stepping each indicator responsive to received impulses, a plurality of cut-off relays corresponding in number to said indicators, one of said cut-off relays being associated with each individual pulsing circuit, a sender including means for simultaneously transmitting pulses over said individual pulsing circuits to simultaneously step said indicators in a restoring operation, means for operating each cut-off relay in response to its corresponding indicator reaching a predetermined position in its restoring operation, means controlled by each operated cut-off relay for opening its corresponding pulsing circuit to stop further stepping of the corresponding indicator in its restoring operation, an automatic switch operative responsive to impulses, a normally open pulsing circuit for operating said switch controlled by said sender, means operated after said restoring operations in response to operation of the last of the cut-off relays operated for restoring said cut-off relays to reclose all of said individual pulsing circuits for a resetting operation and for closing said normally open switch pulsing circuit to simultaneously transmit impulses from said sender to said indicators over their individual pulsing circuits and to said automatic switch over its pulsing circuit to thereby step said indicators in a resetting operation and said switch simultaneously, and means associated with said switch for determining the number of simultaneous steps to be taken by said indicators and said switch in the resetting operation of said indicators from said predetermined position.

5. An indicating system as claimed in claim 4 wherein said determining means includes marking conductors cross-connected from said indicators to said switch and closed at predetermined positions of said switch in accordance with the number of steps to be taken by the indicators in stepping from their predetermined positions to their new reset positions.

6. In an indicating system, a plurality of groups of indicators included in a large group, each indicator having a plurality of positions and each having a means for operating it individually, the groups being arranged in a predetermined order in said large group, selecting means for operatively selecting successive ones of said groups in said order, control means associated with said selecting means common to all of said indicator operating means of a selected indicator group for operating all said selected group indicator operating means simultaneously in a restoring movement, disabling means associated with said indicators and each operated responsive to said restoring movement of its associated indicator to a predetermined position for disabling the indicator operating means associated therewith to thereby stop the restoring movement of the associated indicator, restoring means common to all of said disabling means and operated thereby only in response to all of said disabling means being operated during said restoring movement to restore said disabling means to thereby enable all of said selected indicator operating means for a resetting operation, said control means again operating all of said selected indicator operating means in a resetting operation to move all said selected indicators simultaneously, means common to all said indicators for disabling all of said selected indicator operating means simultaneously when said selected indicators have simultaneously reached a second predetermined position in said resetting operation, and means operated responsive to said common disabling means for then automatically operating said selecting means to operatively select the next successive group of indicators in said order in said large group.

7. In an indicating system, an indicator having a plurality of positions including a normal position, means for operating said indicator from each position to the next, a stepping switch including a plurality of sets of contacts, said switch having a plurality of positions including a normal position corresponding respectively to said indicator positions, a different set of contacts being actuated by said switch in each different position thereof, control means for operating said indicator operating means to move said indicator in a restoring movement, means associated with said indicator and operated responsive to said indicator reaching its normal position for causing said switch to be moved under control of said control means, said indicator and said switch being moved from their normal positions in step in a resetting movement, and means operated responsive to actuator of a designated set of contacts by said switch when moved to the corresponding position for removing said indicator from control of said control means to thereby stop said indicator resetting movement in its corresponding position.

8. In an indicating system as claimed in claim 7, means operated responsive to movement of said switch to the position corresponding to said designated set of contacts for causing said switch to step automatically to its normal position.

References Cited in the file of this patent

UNITED STATES PATENTS

| Number | Name | Date |
|---|---|---|
| 1,852,994 | Frischknecht | Apr. 5, 1932 |
| 1,958,208 | Scheidegger | May 8, 1934 |
| 1,967,331 | Smith | July 24, 1934 |
| 2,076,672 | Robinson | Apr. 13, 1937 |
| 2,103,297 | Nelson | Dec. 28, 1937 |
| 2,248,820 | Haselton | July 8, 1941 |